United States Patent [19]

Dil et al.

[11] 4,347,441

[45] Aug. 31, 1982

[54] DUAL PROBE INTERFEROMETER FOR OBJECT PROFILE MEASURING

[75] Inventors: Jan G. Dil; Johannes C. Driessen; Wichert Mesman, all of Eindhoven, Netherlands

[73] Assignee: U.S. Philips Corporation, New York, N.Y.

[21] Appl. No.: 193,972

[22] Filed: Oct. 6, 1980

[30] Foreign Application Priority Data

Sep. 22, 1980 [NL] Netherlands ......................... 8005259

[51] Int. Cl.³ ............................................. G01N 21/86
[52] U.S. Cl. ...................................... 250/560; 356/358
[58] Field of Search ........................... 250/560, 231 R; 356/355, 356, 357, 358

[56] References Cited

U.S. PATENT DOCUMENTS

| | | | |
|---|---|---|---|
| 4,043,671 | 8/1977 | Goodwin | 356/358 |
| 4,153,370 | 5/1979 | Corey | 356/358 |
| 4,276,480 | 6/1981 | Watson | 250/560 |

*Primary Examiner*—David C. Nelms
*Attorney, Agent, or Firm*—Thomas A. Briody; Robert T. Mayer; Algy Tamoshunas

[57] ABSTRACT

An apparatus is described for accurately measuring the profile on an object. The apparatus comprises two probes for simultaneously scanning the object to be measured and the reference object, the objects being rotatable about the same axis. Each of the probes is provided with a reflecting element, which are respectively incorporated in the measuring arm and reference arm of an interferometer.

8 Claims, 4 Drawing Figures

DUAL PROBE INTERFEROMETER FOR OBJECT PROFILE MEASURING

The invention relates to an apparatus for measuring the profile of an object, which apparatus comprises a rotatable measuring table for the object, a measuring probe which is adapted to be pressed against the object with one end, its other end carrying a reflecting element, and an interferometer whose measuring arm incorporates the reflecting element of the measuring probe.

Such apparatus is described in the article: "Measurement of steep aspheric surfaces" in: "Applied Optics" Vol. 17 No. 4, pages 553–557. The apparatus described therein is employed for determining the shape of a convex or concave aspheric surface. Such a surface is for example the surface of a bi-aspherical lens, i.e. a lens having two aspheric surfaces, or the surface of a mould which is employed for moulding such a lens. Such a lens may be used as an objective in an apparatus for reading a record carrier containing information, for example video and/or audio information or digital data, in an optically readable information structure with very small information details, of the order of 1 $\mu$m or smaller. Such a bi-aspherical objective can be cheaper than an objective comprising a plurality of lenses.

The numerical aperture of such a bi-aspherical objective should be of the order of 0.5. Since said objective should be diffraction limited over a comparatively large field, of the order of 500 $\mu$m, the two surfaces should have a high aspherical slope up to 500 $\mu$m/rad. Because of the desired high quality of the image stringent requirements should be imposed on the shape of the surfaces, which should have an accuracy of the order of $\lambda/4$, and on the surface roughness, which on an average should be of the order of $\lambda/30$. $\lambda$ is the wavelength of the radiation used.

In accordance with said article in "Applied Optics" Vol. 17, No. 4, pages 553–557 the aspherical slope of a surface is measured in two steps. First of all the aspheric surface is placed on the measuring table and the aspherical slope as a function of the angle is determined by means of the probe. In a second step the result of this measurement is applied to a computer and is corrected for systematic errors of the measuring arrangement. These errors arise in that the point about which the measuring table rotates does not coincide with the geometrical centre of the aspheric surface in that the absolute angular position of the point measured first is not exactly known. The geometrical centre of an aspheric surface may be defined as that point which is reasonably representative of the average centre of curvature of the surface. The measuring accuracy of the arrangement can be determined by positioning a spherical surface eccentrically on the measuring table and thus checking the known asphericity by using the method described in the foregoing.

It has been found that in accordance with this method measurements with an accuracy up to approximately 100 nm are possible. The residual inaccuracy is mainly caused by a non-reproducible error in the motion of the measuring table and by mechanical instabilities and thermal drift of the various elements of the apparatus.

It is the object of the invention to provide an apparatus by means of which asphericity and/or surface roughness of an object can be measured, in which said error sources are substantially eliminated and which consequently has a substantially higher accuracy. To this end the apparatus in accordance with the invention is characterized by a reference table for a reference object, which reference table is rotatable in synchronism with and about the same axis as the measuring table, a reference probe, which is adapted to be pressed against the reference object with one end, the other end carrying a reflecting element which is incorporated in the reference arm of the interferometer.

Suitably, the reference object is a sphere. This rotationally symmetrical body imparts any incorrect motion of the common axis of the reference table and the measuring table directly to the reference probe. Said incorrect motion will result in an equal change in the measuring arm and the reference arm of the interferometer and is consequently not visible in the interference pattern of the interferometer. It is also possible to compare an aspheric surface with an aspheric reference surface. However, positioning the reference surface is then more difficult.

In order to preclude inaccuracies as a result of mechanical instabilities the apparatus is further characterized in that two bars, carrying the probes, are connected to a column which is secured to a base plate and that the shaft of a turntable, which comprises the measuring table and the reference table in the form of two platforms, is journalled in said base plate, by air bearing means. This provides a satisfactory construction.

In order to enable the object and the reference object to be positioned accurately before the actual measurement, the apparatus in accordance with the invention is further characterized in that on the ends of the bars there are arranged positioning tables for the probes and that on each of the two platforms of the turntable there is arranged a positioning table for respectively centring the object to be measured and the reference object relative to the turntable axis.

A preferred embodiment of the apparatus in accordance with the invention is characterized in that the bars, the column, the base plate and the turntable consist of the material Zerodur and that the positioning tables for the probes, the object to be measured and the reference object are of the material Invar. The influence of temperature variations on the measurement is then minimized.

The invention will now be described in more detail with reference to the drawing, in which.

Figure 1:
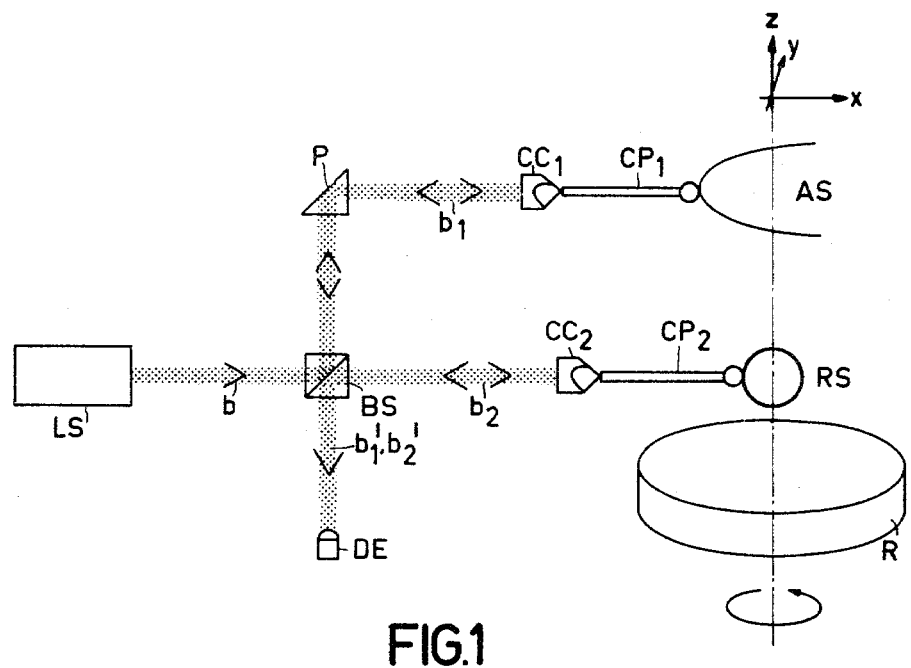
FIG. 1 illustrates the principle of the invention.

In FIG. 1 the surface to be measured, for example an aspheric surface, is designated AS. This surface is scanned by means of a measuring probe $CP_1$. The aspheric surface is fixed onto a measuring table in such way that its geometrical centre coincides with the axis of rotation AR, for example within an accuracy of 100 $\mu$m. A reference probe $CP_2$ is in contact with the reference sphere RS which is arranged on a reference table. The measuring table and the reference table are constituted by two platforms, shown in FIG. 2, of the same turntable R.

The two probes are provided with a reflecting element, $CC_1$ and $CC_2$ respectively, on one end. Said reflecting elements form part of an interferometer system which is shown in the left-hand part of FIG. 1. A monochromatic radiation source LS, for example a laser, emits a beam b with a great coherence length. The beam splitter BS transmits a part of the beam b to the reflecting element $CC_2$ as a subbeam $b_2$. The beam splitter reflects the rest of the beam b as a subbeam $b_1$ to a reflection prism P, which directs the subbeam $b_1$ to the reflecting element $CC_1$.

As is shown in FIG. 1, the reflecting elements may be constituted by a prism with three reflecting surfaces which are perpendicular to each other, a so-called "corner-cube" prism. A beam which is consecutively reflected by these three surfaces has the same direction as the beam which enters the prism, independently of the angular position of the prism. Thus, an alignment of said angular position is not necessary. A similar effect can be obtained by means of a so-called "cat's-eye" mirror system, comprising a lens and a mirror arranged in the focal plane thereof.

A part $b_1'$ of the subbeam $b_1$ which is reflected by the reflecting element $CC_1$ is transmitted by the beam splitter BS, whilst a part $b_2'$ of the subbeam $b_2$ which is reflected by the reflecting element $CC_2$ is reflected by the beam splitter. Said subbeams then interfere with each other, the resulting intensity depending on the relative phase of the subbeams $b_1'$ and $b_2'$. Thus, said intensity will vary if the optical pathlengths of the subbeams $b_1$ and $b_2$ vary relative to each other, i.e. if the probes $CP_1$ and $CP_2$ move relative to each other, in other words if there are differences in the local shapes of the surfaces AS and RS.

The resulting intensity can be measured by means of one radiation-sensitive detector DE, which may for example be arranged on the optical axis of the system. When the reflecting element $CC_1$ moves relative to the reflecting element $CC_2$ this results in a periodic pulse-shaped signal on the output of said detector.

Use can be made of an interferometer arrangement as described in "Philips Technical Review" 30 No. 6/7, pp. 160–165. Said arrangement employs a special frequency-stabilized laser, which produces a laser beam with two oppositely circularly polarized components of equal intensity but of different frequency. The magnitude and the direction of the displacement of the probes relative to each other can then be determined accurately from the signals supplied by two radiation-sensitive detectors, one for each beam component. The shape of the aspheric surface is then accurately known.

It is alternatively possible to employ a different interferometer arrangement, which is simpler while having substantially the same accuracy. Said interferometer is adapted so that the reflected beams $b_1'$ and $b_2'$ make a small angle with each other. These beams then form a linear interference pattern. The change of the intensity distribution of the interference as a result of a displacement of the probes relative to each other may be regarded as "travelling" of said pattern. The interference pattern itself may be regarded as a grating with gradual transitions from bright to dark stripes. The motion of this travelling grating can then be determined by means of a reference grating, whose grating period is equal to the period of the interference pattern. The reference grating may be constituted by a multiple photocell comprising a linear array of substantially identical photodiodes which are sequentially connected to an electronic circuit for processing the photo diode signals by means of an electronic switch.

Figure 2:
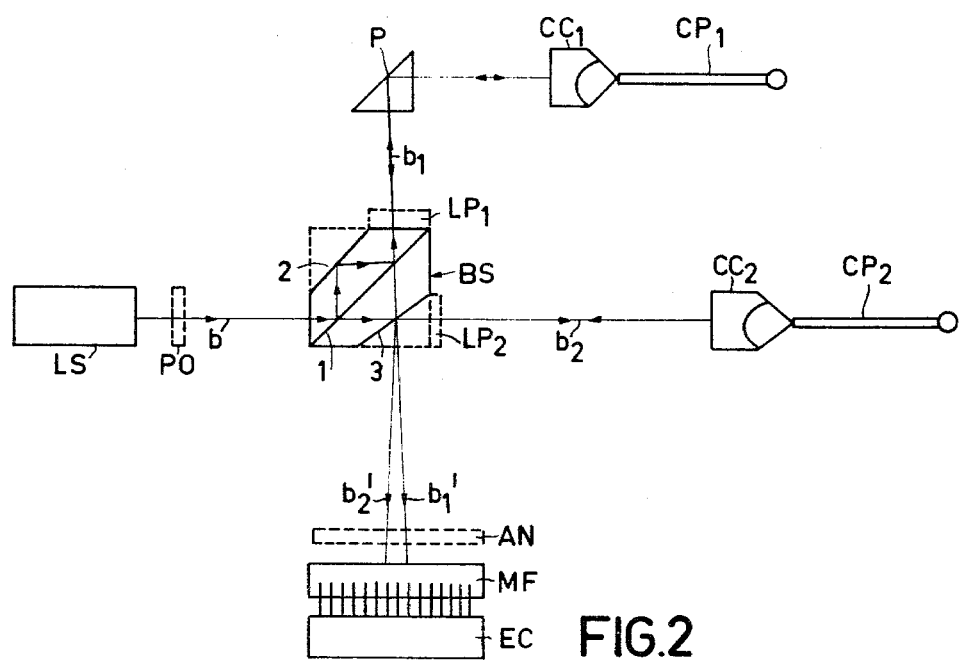
FIG. 2 shows an example of an interfereometer used in the present apparatus.

FIG. 2 shows an example of an interferometer employing a multiple photocell as radiation-sensitive detection system. The beam splitter BS is now constituted by by a prism of a special shape. Said prism may be thought to consist of a normal semi-transparent prism, represented by dashed lines in FIG. 2, with a semi-reflecting surface 1, and provided with a second fully reflecting surface 2 and a third semi-reflecting surface 3. The portion of the beam b which is reflected by the surface 1 is fully reflected by the surface 2 and is subsequently partly reflected to the prism p by the surface 1 as a subbeam $b_1$. The portion of the beam b which is transmitted by the surface 1 is partly transmitted by the surface 3 as a beam $b_2$. The surfaces 1 and 3 transmit a part $(b_1')$ of the beam which is reflected by the reflector $CC_1$, whilst a part $(b_2')$ of the beam which is reflected by the reflector $CC_2$ is reflected by the surface 3. By a suitable choice of the angle between the surfaces 2 and 3 a small angle can be obtained between the reflected beams $b_1'$ and $b_2'$.

In order to minimize radiation losses the surfaces 1 and 3 in the apparatus shown in FIG. 1 are preferably constituted by polarization-sensitive splitting mirrors. In that case quarter-wave plates $LP_1$ and $LP_2$ should be included in the paths of the beams $b_1$ and $b_2$, which are perpendicularly polarized relative to each other, and an analyzer should be arranged before the detection system MF. The said elements are represented by dashed lines in FIG. 2. A polarizer may be arranged before the beam splitter BS in order to adapt the polarization of the beam produced by the laser source LS.

In the apparatus of FIG. 2, with the elements $LP_1$, $LP_2$ and AN, a normal prism with a polarization-sensitive surface may be employed as beam splitter BS instead of the special prism. The small angle between the subbeams $b_1'$ and $b_2'$ can then be obtained by means of a Wollaston prism in the common path of said subbeams.

In FIG. 2 the multiple photocell is designated MF and the combination of electronic switch and electronic processing circuit is designated EC. The electronic switch ensures that a reference grating apparently travels over the surface of the multiple photocell.

For further details of the multiple photocell and the associated electronic switching-and processing circuit reference is made to U.S. Pat. No. 3,973,119, herewith incorporated by reference, which Specification describes how the multiple photocell can be used as a reference grating in a grating measuring system. Whereas in the grating measuring system the periodicity in the detector signal is determined by the grating period of the measuring grating, which grating period is of the order of a few hundreds of $\mu$m, the periodicity of the detector signal in the present interferometer is determined by half the wavelength of the radiation used. Thus, with this interferometer a substantially higher accuracy can be attained than with the displacement meter in accordance with U.S. Pat. No. 3,973,119.

In order to ensure that the entire arrangement has the high accuracy given by the interferometer, stringent requirements should be imposed on the mechanical and thermal stability of said apparatus. Thus, if the apparatus is at rest, the mutual displacement of the two reflecting elements, i.e. of the probes occurring in one hour should not exceed 5 nm.

Furthermore, it is desirable that surfaces of different average radii of curvature can be measured, for example up to 100 mm. Therefore, coarse adjustment of the probes should be possible over a range of approximately 100 mm, after which accurate alignment with the axis of rotation should be possible.

Furthermore, the object to be measured and the reference object should be accurately centred relative to the axis of rotation, up to for example 100 μm. After the various elements have been positioned there should be no longer any displacement or drift.

Figure 3:
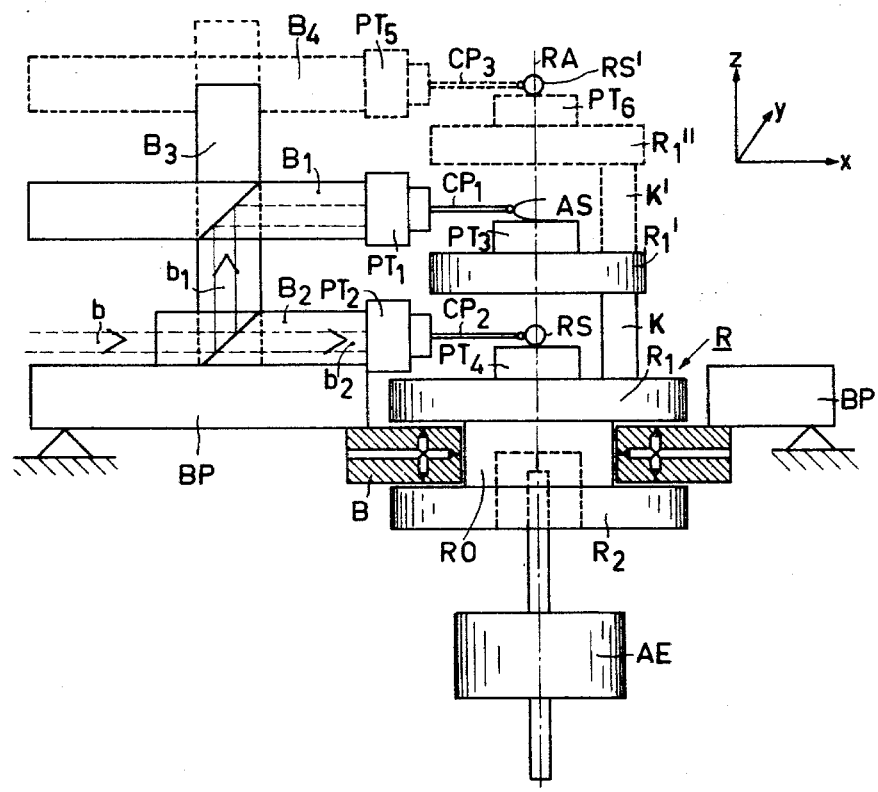
FIG. 3 shows the mechanical construction of the apparatus in accordance with the invention.

The said requirements can be met by means of the mechanical construction shown in FIG. 3. The probes $CP_1$ and $CP_2$ are carried by hollow, substantially square, bars $B_1$ and $B_2$, which are adjustably mounted on a column $B_3$. The elements $B_1$, $B_2$ and $B_3$ form a suitable construction, by means of which the probes $CP_1$ and $CP_2$ can be coarse-adjusted in the X-direction. On the ends of the bars $B_1$ and $B_2$ YZ-positioning tables $PT_1$ and $PT_2$ are arranged, by means of which the probes $CP_1$ and $CP_2$ can be aligned with the axis of rotation.

The adjustable bars $B_1$, $B_2$ and $B_3$ with the positioning tables $PT_1$ and $PT_2$ together constitute the measuring head of the apparatus. Said measuring head is mounted on a base plate BP, which is for example 40 mm thick and in which also the turntable R is journalled. Said turntable comprises two parallel discs $R_1$ and $R_2$ which are interconnected by a rod RO. The turntable is journalled in the housing B, which is connected to the base plate BP, by air-bearing means. This construction substantially excludes any shift of the axis of rotation in the axial and transverse directions. In order to eliminate any further tilting an angle encoder AE and the turntable are coupled to each other in the geometrical centre of the shaft. This coupling is such that the turntable and the angle encoder have exactly the same angular frequency. The angle encoder may be driven with an angular frequency which is adjustable between 0.2 and 200 mrad/sec. In practice an angular frequency 3 mrad/sec. was adopted, so that a scan through $\pi$ rad took approximately 15 minutes.

The upper part of the turntable comprises two platforms $R_1$ and $R_1'$, which are interconnected by columns K, of which only one column is shown. The object AS to be measured and the reference object RS are substantially centred on the axis of rotation with the aid of XY-positioning tables $PT_3$ and $PT_4$. The entire apparatus is mounted on a vibration-absorbing table.

In order to minimize the independence of temperature variations, the bars $B_1$, $B_2$ and $B_3$, the turntable elements $R_1$, $R_2$, RO, $R_1'$ and K are preferably made of Zerodur, which is a glass-ceramic material which exhibits substantially no thermal expansion. The positioning tables $PT_1$, $PT_2$, $PT_3$ and $PT_4$ can be made of Invar, which is an alloy which neither exhibits any significant thermal expansion and the housing B of bronze. Suitably, the apparatus is accommodated in a space in which the temperature can be maintained constant. The measuring arm and the reference arm of the interferometer suitably have substantially equal lengths, so that the influence of atmospheric changes, such as changes in pressure and relative humidity are negligible.

Figure 4:
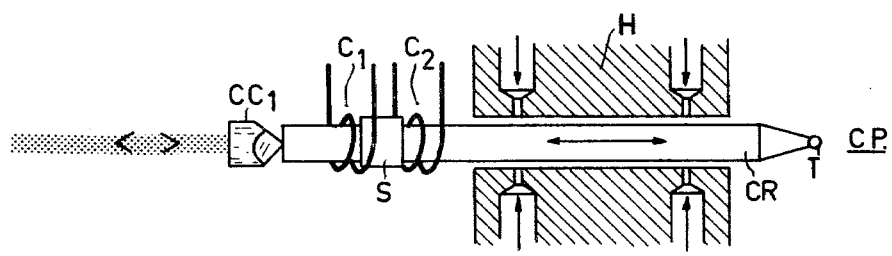
FIG. 4 shows the construction and control of the probes employed in said apparatus.

FIG. 4 represents the probe $CP_1$ in detail. Said probe is a displacement transducer which is journalled by an air-bearing means and comprises a rod CR, preferably of Zerodur, in a housing H, preferably of bronze. In order to enable the force with which the probe presses against the object to be adjusted, a magnet may be arranged on the rod CR, which is movable under the influence of the field produced in a magnetic coil. Suitably, as is shown in FIG. 4, a soft-iron core is mounted on the rod CR, which core cooperates with two coils $C_1$ and $C_2$. Through the two coils a current is passed, the soft-iron core and thus the probe being moved in the direction of the coil through which the larger current flows. By now ensuring that the total current through the two coils is constant, i.e. that the difference between the currents through $C_1$ and $C_2$ when the probe is pressed in position is equal to the difference between said currents when the probe is retracted it is achieved that the power which is dissipated during pressing in position is equal to the power which is dissipated upon retraction, which constitutes an additional temperature stabilization.

It is obvious that the probe $CP_2$ has the same construction as the probe $CP_1$.

The tip T of each probe, if the apparatus is employed for determining aspherical slope only, may comprise a sphere of for example saphire having a radius of 1 mm. The out-of-roundness of said sphere is for example less than 5 nm over an angle of 30°. Owing to the comparatively large radius of the sphere the influence of any surface roughness in the measuring signal is averaged out.

When measuring surface-roughnesses of an object the tip T comprises a diamond stylus with a suitable smaller radius and the force with which the probe is pressed against the surface is adapted, if necessary.

When using a tip T with a small radius the aspherical slope and the surface roughness can be measured simultaneously. In that case a signal of higher frequency representing the surface roughness is superimposed on the measuring signal representing the aspherical slope.

As is represented by the dashed lines in FIG. 3, the apparatus may be extended with a third probe $CP_3$, which scans a second reference surface RS'. Said probe, together with the probe $CP_2$, is employed in order to eliminate the influence of a residual misalignment of the axis of rotation RA on the measuring result. The third probe is carried by a third bar $B_4$ on which a positioning table $PT_5$ is mounted. The reference surface RS' is arranged on a positioning table $PT_6$, which is carried by a reference table $R_1''$, which table is connected to the turntable R via the columns K'.

In an embodiment of an apparatus in accordance with the invention employing a laser interferometer of the type Hewlett-Packard with a measuring time of approximately 1 msec. and an angle encoder of the type Heidenhain ROD 800, it was possible to measure the shape of an aspheric surface with a precision of ±5 nm.

What is claimed is:

1. An apparatus for measuring the profile of an object, which apparatus comprises a rotatable measuring table for the object, a measuring probe having one end which is adapted to be pressed against the object and a second end carrying a reflecting element, and an interferometer, whose measuring arm incorporates the reflecting element of the measuring probe, characterized by a reference table for a reference object, which reference table is rotatable in synchronism with and about the same axis as the measuring table, a reference probe, having one end which is adapted to be pressed against the reference object, and a second end carrying a reflecting element which is incorporated in the reference arm of the interferometer.

2. An apparatus as claimed in claim 1, characterized in that two bars, carrying the probes, are connected to a column which is secured to a base plate, and that the shaft of a turntable, which comprises the measuring table and the reference table in the form of two platforms, is journalled in said base plate by air-bearing means.

3. An apparatus as claimed in claim 2, characterized in that on the ends of the bars there are arranged positioning tables for the probes and that on each of the two platforms of the turntable there is arranged a positioning table for respectively centring the object to be measured and the reference object relative to the turntable axis.

4. An apparatus as claimed in claim 3, characterized that the bars, the column, the base plate and the turntable consist of the material Zerodur and that the positioning tables for the object to be measured, the reference object and the probes are of the material Invar.

5. An apparatus as claimed in claim 1, 2, 3 or 4, characterized in that each of the probes is constituted by a rod, which is journalled by air-bearing means and which is provided with magnetic pressure means, whose pressure force is adjustable.

6. An apparatus as claimed in claim 5, characterized in that the magnetic pressure means are constituted by a soft-iron core arranged on the rod and by two coils, electric currents being simultaneously passed through the two coils, and that the sum of the currents through the two coils is constant.

7. An apparatus as claimed in any one of claims 1 to 4, characterized by a second reference probe for scanning a second reference object and by a second reference table which is rotatable in synchronism with and about the same axis as the measuring table and the first reference table.

8. An apparatus as claimed in any one of claims 1 to 4, characterized in that the radiation-sensitive detection system of the interferometer is a multiple photocell comprising a linear array of photodiodes, which are sequentially connected to an electronic circuit for processing the signal generated in the photodiodes by means of an electronic switch.

* * * * *